(12) United States Patent
Murase

(10) Patent No.: US 8,286,019 B2
(45) Date of Patent: *Oct. 9, 2012

(54) POWER EFFICIENT DATA STORAGE WITH DATA DE-DUPLICATION

(75) Inventor: Atsushi Murase, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 30 days.

This patent is subject to a terminal disclaimer.

(21) Appl. No.: 12/957,582

(22) Filed: Dec. 1, 2010

(65) Prior Publication Data

US 2011/0072291 A1  Mar. 24, 2011

Related U.S. Application Data

(63) Continuation of application No. 11/902,824, filed on Sep. 26, 2007, now Pat. No. 7,870,409.

(51) Int. Cl.
*G06F 1/32* (2006.01)
(52) U.S. Cl. .................. 713/324; 713/300; 713/320
(58) Field of Classification Search ............ None
See application file for complete search history.

(56) References Cited

U.S. PATENT DOCUMENTS

| | | | |
|---|---|---|---|
| 5,297,124 A | 3/1994 | Plotkin et al. | |
| 7,035,972 B2 * | 4/2006 | Guha et al. | 711/114 |
| 7,669,023 B2 | 2/2010 | Murase | |
| 7,734,603 B1 | 6/2010 | McManis | |
| 7,870,409 B2 * | 1/2011 | Murase | 713/324 |
| 2005/0216669 A1 | 9/2005 | Zhu et al. | |
| 2008/0104081 A1 | 5/2008 | Mimatsu | |
| 2008/0104204 A1 | 5/2008 | Moore et al. | |
| 2008/0244172 A1 | 10/2008 | Kano | |
| 2009/0083563 A1 | 3/2009 | Murase | |

FOREIGN PATENT DOCUMENTS

| | | |
|---|---|---|
| EP | 2 042 979 A2 | 4/2009 |
| WO | 2007/089502 A1 | 8/2007 |

* cited by examiner

*Primary Examiner* — Dennis M Butler
(74) *Attorney, Agent, or Firm* — Mattingly & Malur, PC

(57) ABSTRACT

A storage system includes a first de-duplication scope comprising a first volume, a first table of hash values corresponding to first chunks of data stored on the first volume, and a first table of logical block addresses of where the chunks of data are stored on the first volume. A second de-duplication scope includes similar information for a second volume. The first scope is used for de-duplicating and storing first data from a first data source and the second scope is used for de-duplicating and storing second data from a second data source. First storage mediums that make up the first volume remain powered off while de-duplication and storage of the second data on the second volume takes place, and second storage mediums that make up the second volume remain powered off while de-duplication and storage of the first data takes place, thereby enabling data de-duplication while saving power.

17 Claims, 12 Drawing Sheets

Logical Element Structure

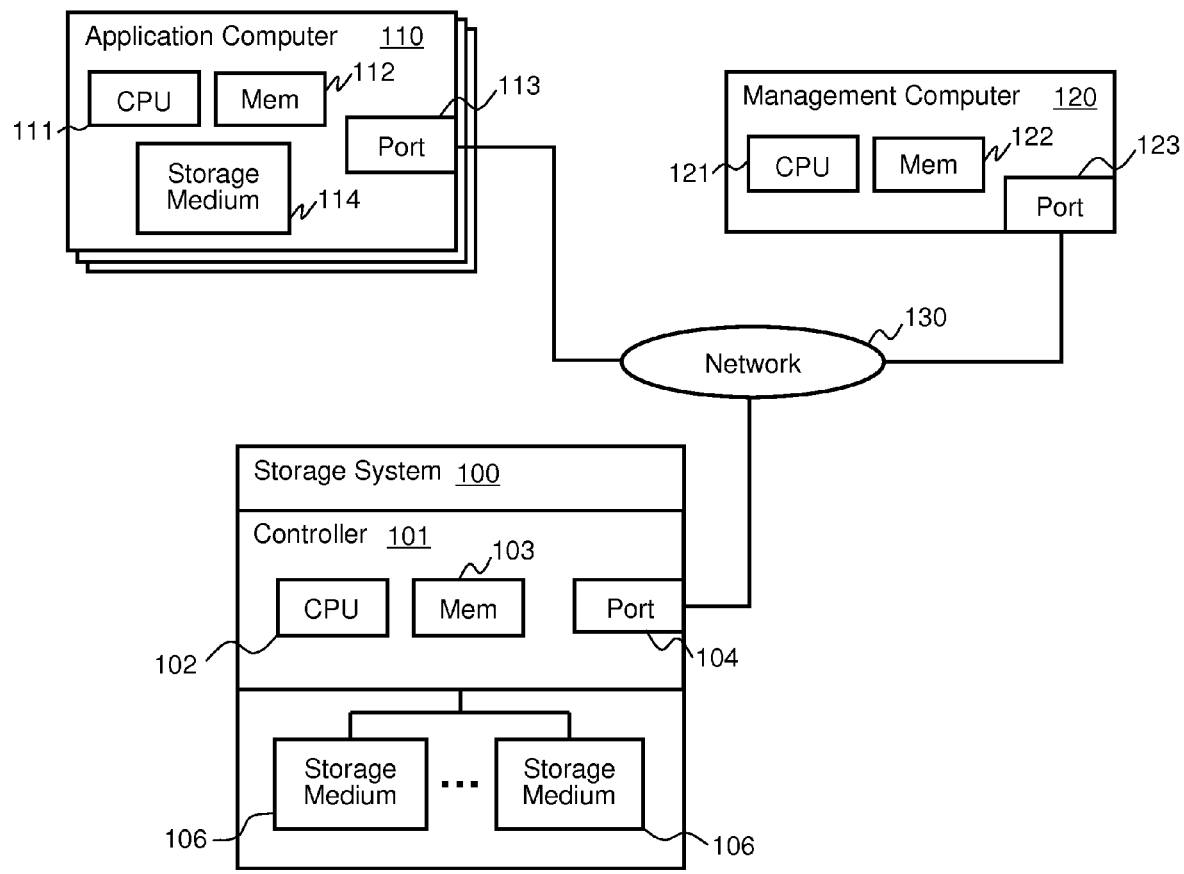
FIG. 1 Hardware Architecture

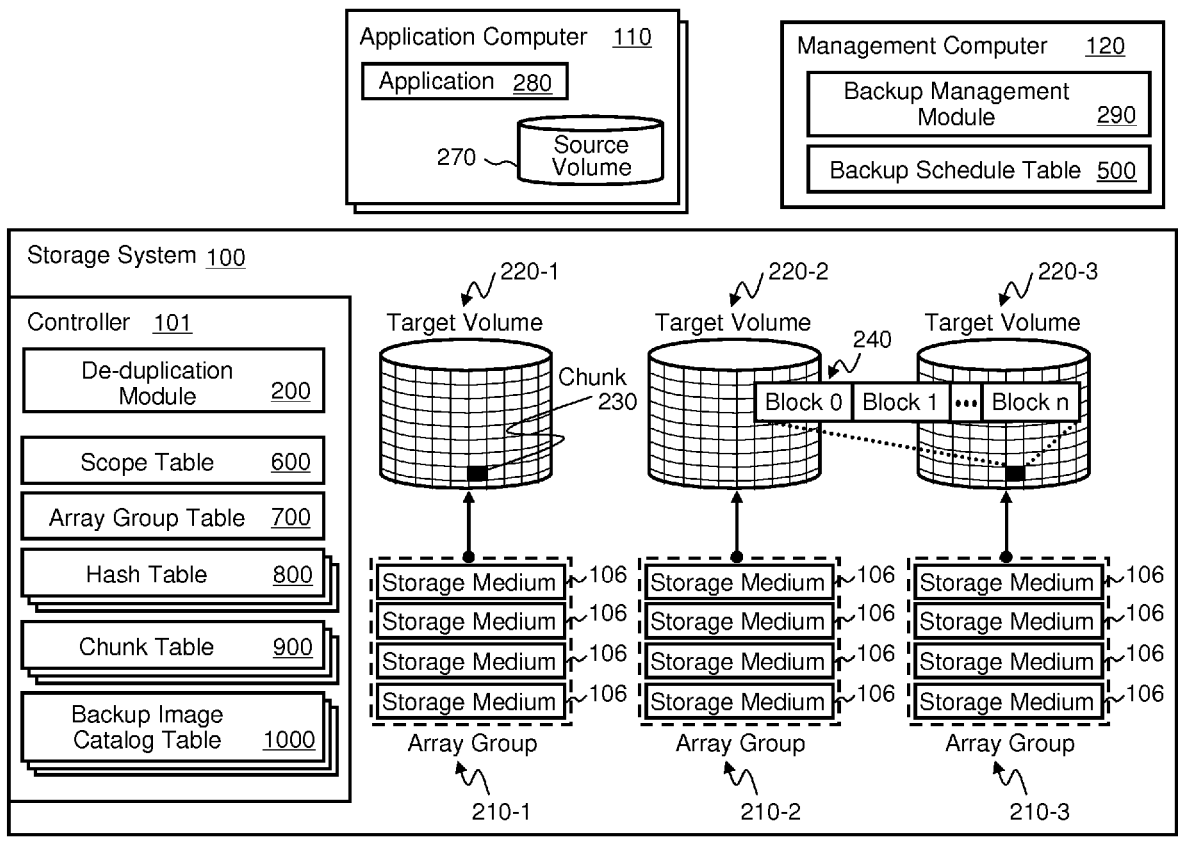
FIG. 2 Logical Element Structure

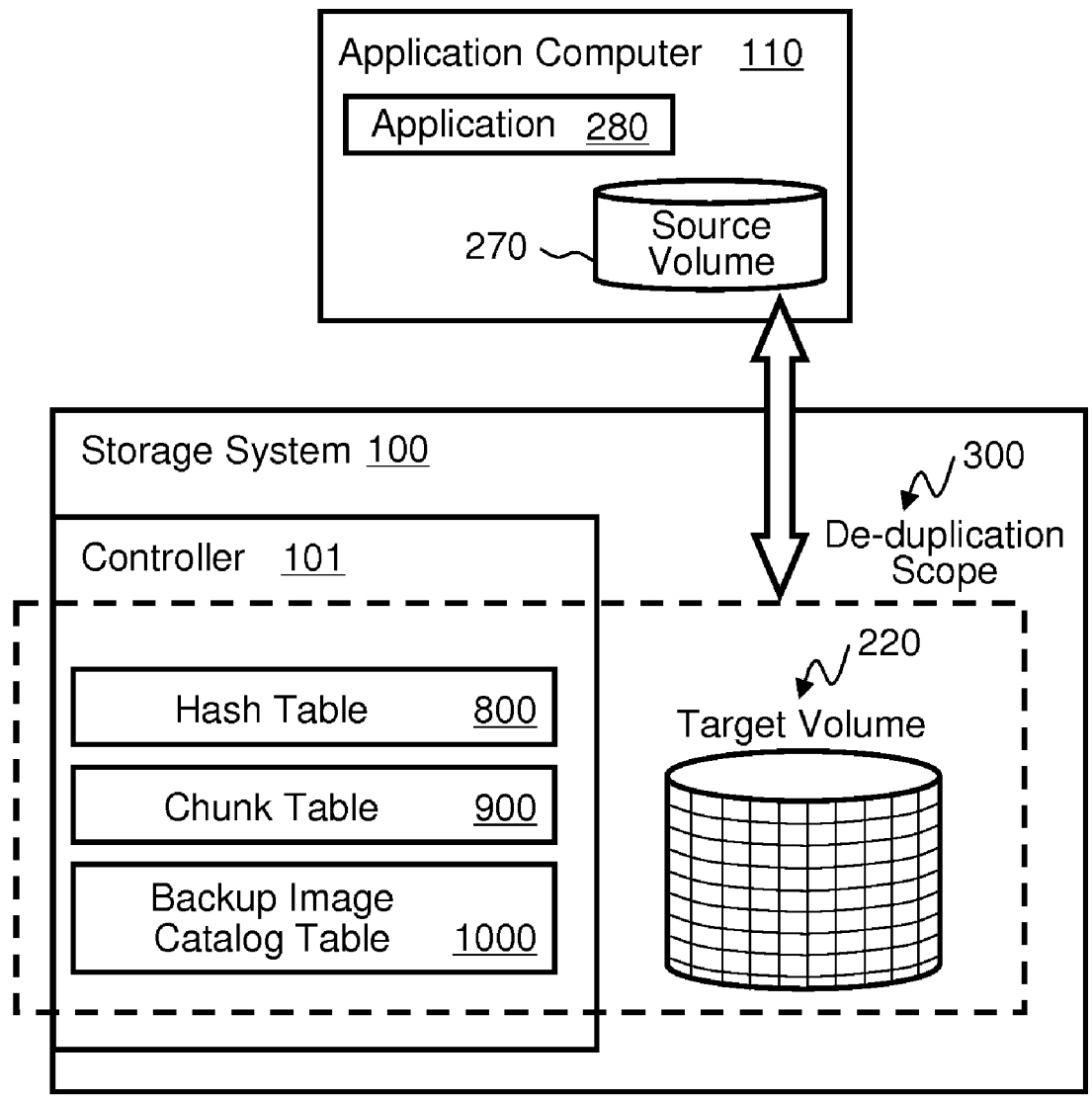
FIG. 3 Logical Structure of De-duplication Scope

Figure 4:
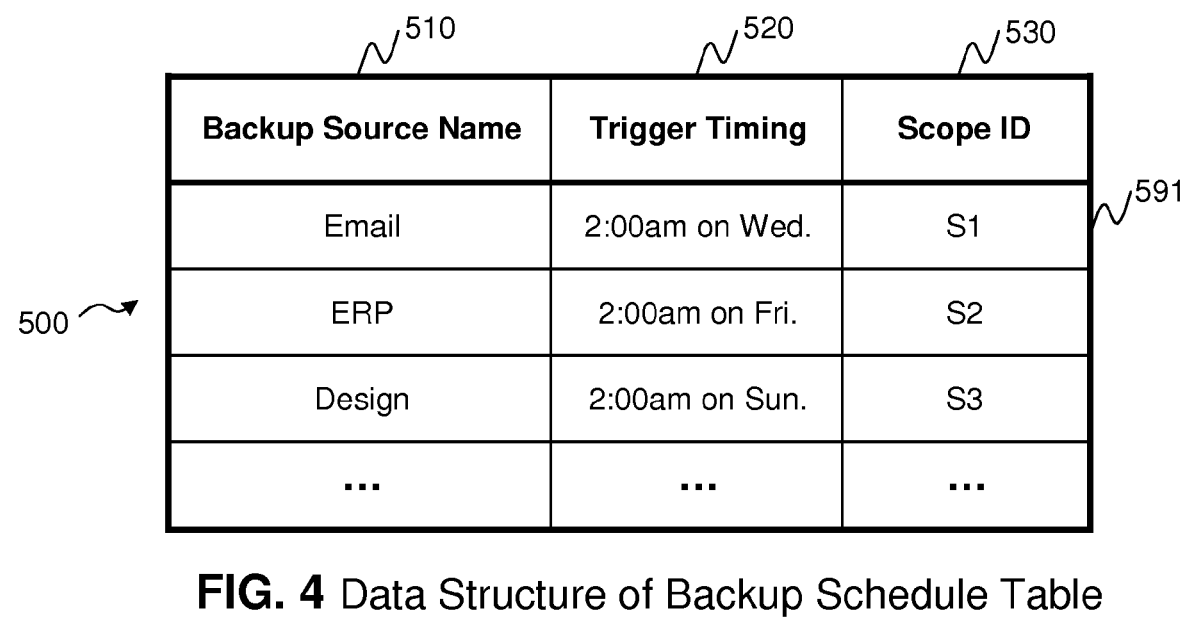

| Backup Source Name | Trigger Timing | Scope ID |
|---|---|---|
| Email | 2:00am on Wed. | S1 |
| ERP | 2:00am on Fri. | S2 |
| Design | 2:00am on Sun. | S3 |
| ... | ... | ... |

FIG. 4 Data Structure of Backup Schedule Table

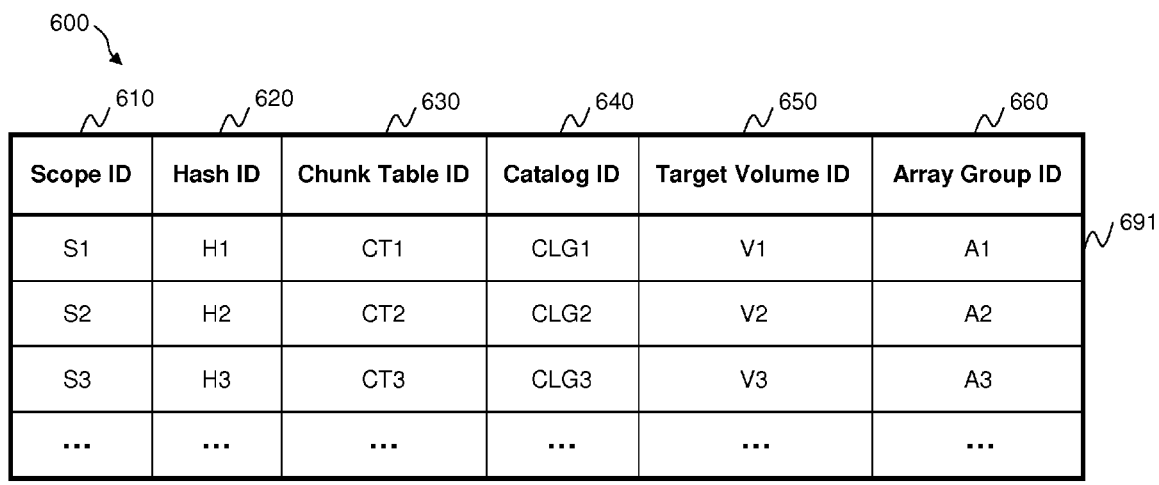
FIG. 5 Data Structure of Scope Table

| Array Group ID | Medium ID |
|---|---|
| A1 | M1 |
| A1 | M2 |
| A1 | M3 |
| ... | ... |
| A2 | M7 |
| A2 | M8 |
| ... | ... |

FIG. 6 Data Structure of Array Group Table

| Hash Value | Chunk ID |
|---|---|
| S1HV1 | S1Ch1 |
| S1HV2 | S1Ch2 |
| S1HV2 | S1Ch3 |
| S1HV3 | S1Ch4 |
| ... | ... |

FIG. 7 Data Structure of Hash Table

| Chunk ID | Start LBA | Number of Blocks |
|---|---|---|
| S1Ch1 | 0 | 32 |
| S1Ch2 | 32 | 25 |
| ... | ... | ... |

FIG. 8 Data Structure of Chunk Table

| Backup Image ID | Timestamp | Sequential Number | Chunk ID |
|---|---|---|---|
| S1BU0000 | T1 | 0 | S1Ch1 |
| S1BU0000 | T1 | 1 | S1Ch2 |
| ... | ... | ... | ... |
| S1BU0001 | T2 | 0 | S1Ch1 |
| ... | ... | ... | ... |

FIG. 9 Data Structure of Backup Image Catalog Table

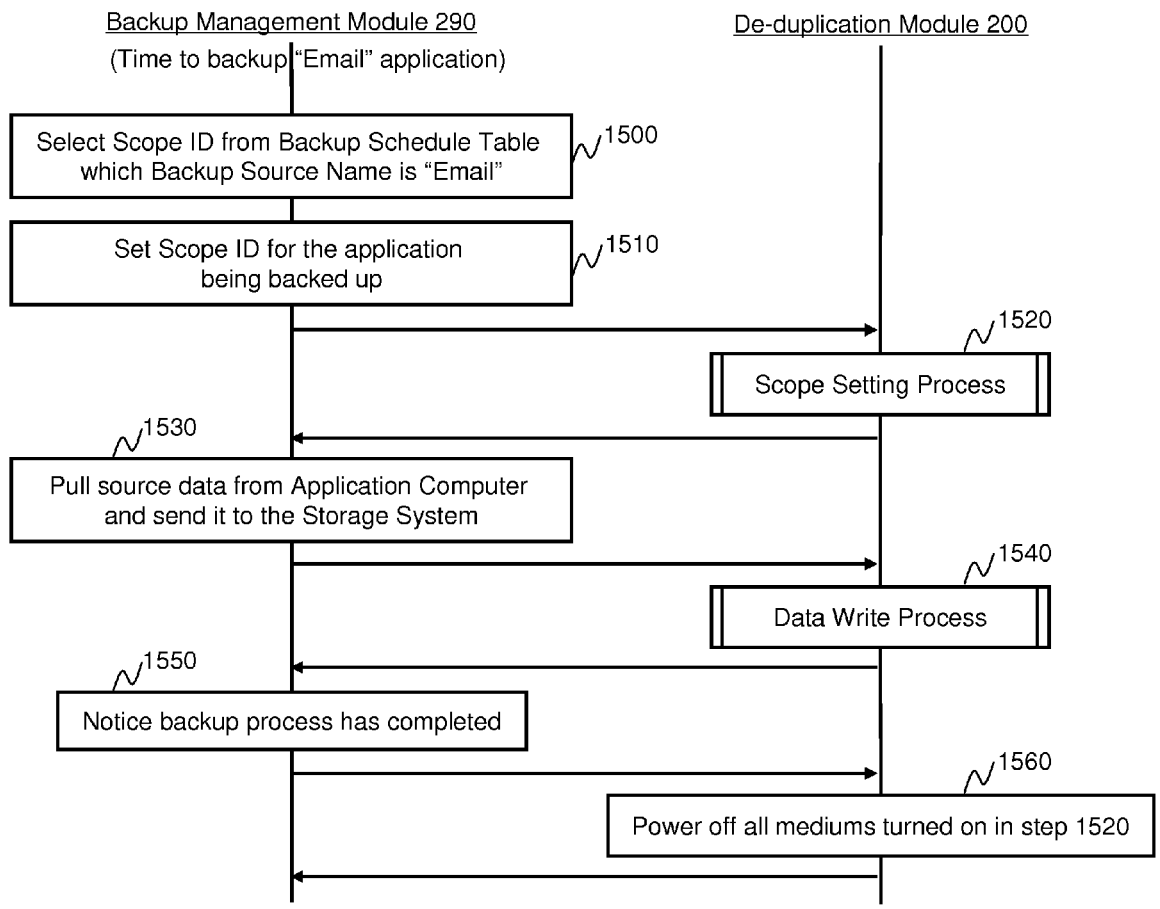
FIG. 10 Entire Process of Data Backup

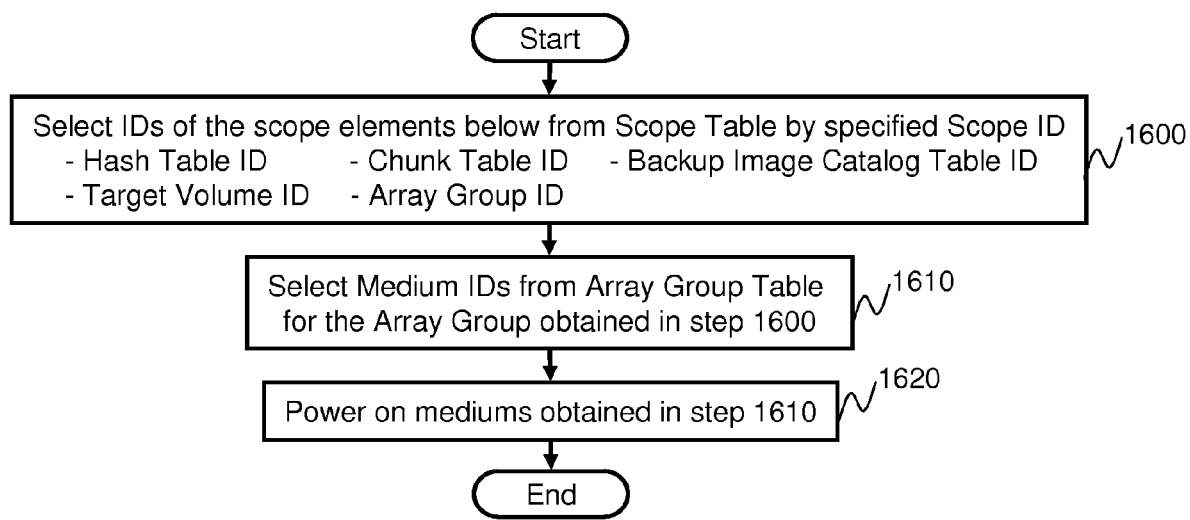
FIG. 11 Scope Setting Process

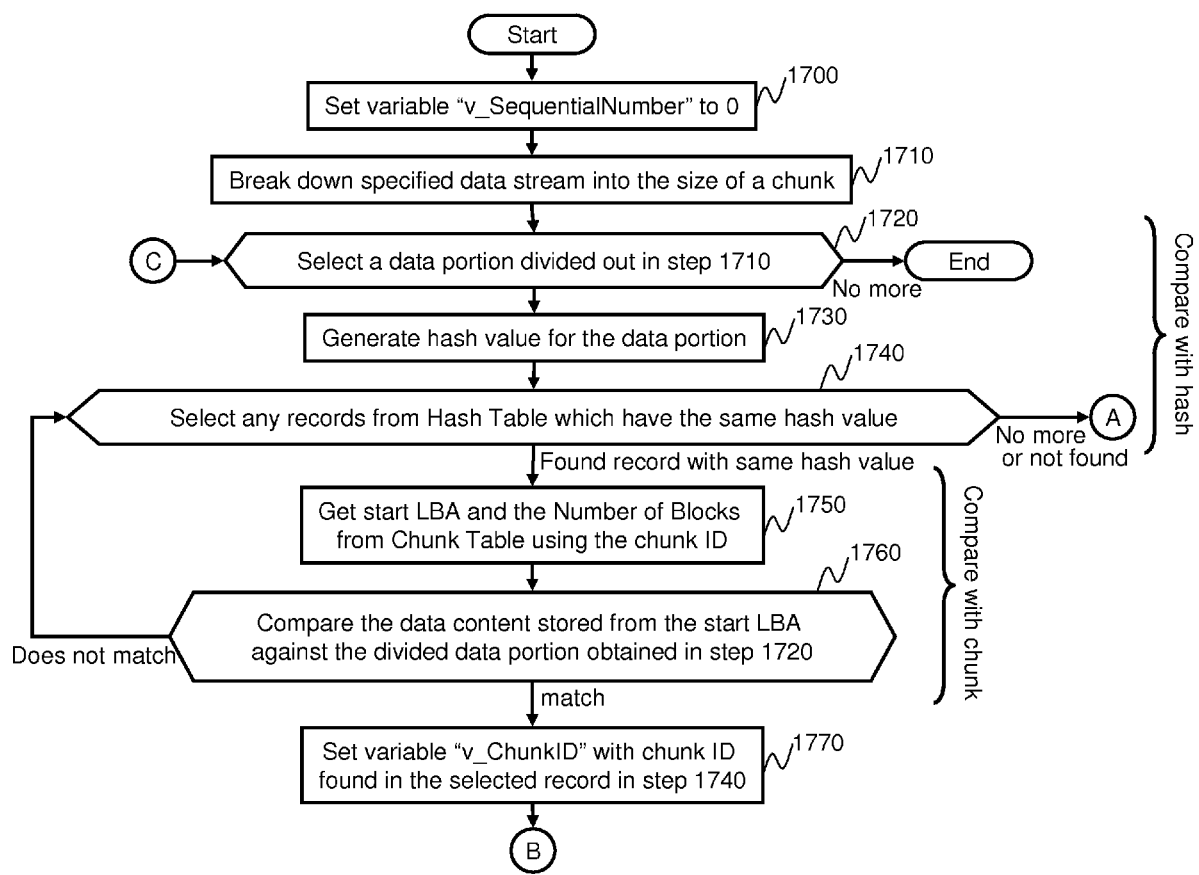
FIG. 12A Data Write Process

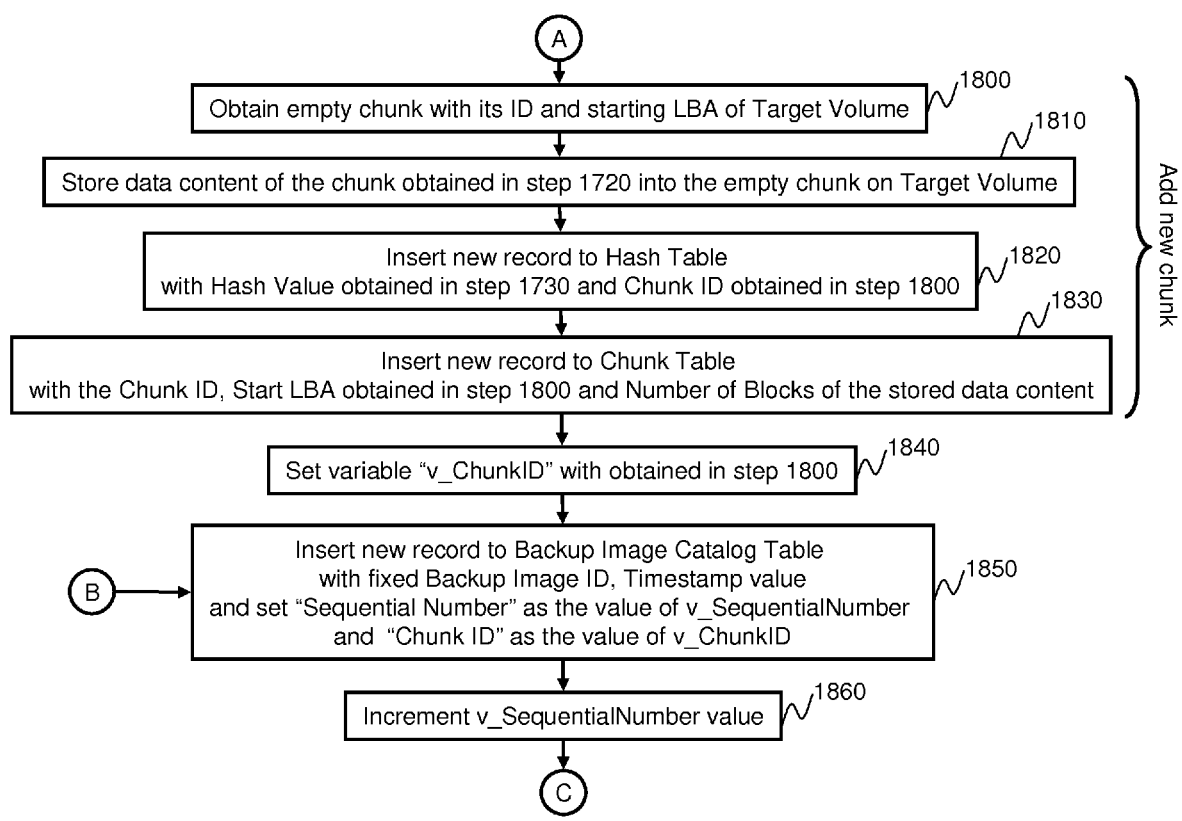
FIG. 12B Data Write Process (Cont.)

US 8,286,019 B2

POWER EFFICIENT DATA STORAGE WITH DATA DE-DUPLICATION

This application is a continuation of U.S. patent application Ser. No. 11/902,824, filed Sep. 26, 2007, which is incorporated herein by reference in its entirety.

BACKGROUND OF THE INVENTION

1. Field of the Invention

The present invention relates generally to information systems and storage systems.

2. Description of Related Art

A number of factors are significantly increasing the cost of operating data centers and other information processing and storage facilities. These factors include a tremendous increase in the amount of data being stored, rising energy prices, and computers and storage systems that are consuming more electricity and that are requiring greater cooling capacity. If current trends continue, many data centers may soon have insufficient power capacity to meet their needs due to the increasing density of equipment and rapid growth in the scale of the data centers. Therefore, achieving power efficiency is a very critical issue in today's datacenters and other information processing and storage facilities. Related art includes U.S. Pat. No. 7,035,972, entitled "Method and Apparatus for Power-Efficient High-Capacity Scalable Storage System", to Guha et al., filed Jun. 26, 2003, the entire disclosure of which is incorporated herein by reference.

Also, solutions for addressing the tremendous increase in the amount of data being stored include technologies for reducing this huge amount of data. One such technology is data de-duplication, which is based on the premise that a large amount of the data stored in a particular storage environment already has redundant portions also stored within that same storage environment. During the data writing process, a typical de-duplication function breaks down the data stream into smaller chunks of data and compares the content of each chunk of data to chunks previously stored in the storage environment. If the same chunk of data has already been stored in the storage system, then the storage system just makes a new link to the already-stored data chunk, rather than storing the new data chunk that has same content. Related art includes U.S. Pat. Appl. Pub. No. 2005/0216669, entitled "Efficient Data Storage System", to Zhu et al., filed May 24, 2005, the entire disclosure of which is incorporated herein by reference, and which teaches a typical method for storing data with a de-duplication function.

Consequently, the use of data de-duplication in a storage environment reduces the overall size of the data stored in the storage environment, and this technology has been adopted in many storage systems, including in VTL (Virtual Tape Library) systems and other systems for performing data backup. Prior art related to VTL systems includes U.S. Pat. No. 5,297,124, to Plotkin et al., entitled "Tape Drive Emulation System for a Disk Drive", the entire disclosure of which is incorporated herein by reference, and which is directed to a VTL system, namely, a virtual tape backup system that uses a disk drive to emulate tape backup. Using VTL or other data backup systems, it is possible to consolidate all data for backup from a variety of applications, divisions, sources, etc., into a single data backup storage solution that allows single-point management as well. However, because de-duplication technology continuously compares new incoming data chunks with previously-stored data chunks at the volumes of the storage system, these volumes need to be always powered on. This is because any of the previously-stored chunks may need to be compared with a new incoming chunk, and there is no guarantee that a specific portion of the stored data will not be needed for making the comparison over any certain period of time. This situation, while reducing the overall amount of data stored, does little else to aid in reducing the amount of power consumed by the storage system. Accordingly, there is a need for a more power-efficient method for performing data backup while also performing de-duplication of the data being backed up.

BRIEF SUMMARY OF THE INVENTION

Embodiments of the invention reduce power consumption in a data backup system by controlling disk power supply while also utilizing a de-duplication function on the system to reduce the overall amount of storage capacity required. Thus, the invention provides benefits not available with the prior art, since the present invention saves power while also causing the storage system to store data more efficiently by performing a de-duplication function. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 1 illustrates an example of a hardware configuration in which the method and apparatus of the invention may be applied.

FIG. 2 illustrates an example of a logical configuration of the invention applied to the architecture of FIG. 1.

FIG. 3 illustrates an example of a logical structure of de-duplication scope.

FIG. 4 illustrates an exemplary data structure of a backup schedule table.

FIG. 5 illustrates an exemplary data structure of a scope table.

FIG. 6 illustrates an exemplary data structure of an array group table.

FIG. 7 illustrates an exemplary data structure of a hash table.

FIG. 8 illustrates an exemplary data structure of a chunk table.

FIG. 9 illustrates an exemplary data structure of a backup image catalog table.

FIG. 10 illustrates an exemplary process for data backup.

FIG. 11 illustrates an exemplary scope setting process.

FIGS. 12A-12B illustrate an exemplary data write process.

DETAILED DESCRIPTION OF THE INVENTION

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

Embodiments of the invention include methods and apparatuses for providing a de-duplication solution to address the explosion in the amount of data being stored in certain industries, and embodiments of the invention also introduce a disk power control technology that reduces the amount of power consumed by storage devices. The inventor has determined that in certain storage environments, a large amount of data being stored is backup data that does not need to be accessed frequently, and in fact, a large amount of data is stored and never accessed again. The invention takes advantage of this phenomenon by determining optimal situations in which to turn off the disk spindles for the storage devices that do not have to be active all the time, thereby reducing the power consumption of the storage devices and also reducing the power consumed for cooling.

Embodiments of the invention include a data backup system such as a VTL system that maintains a "de-duplication scope" internally in the system. The de-duplication scope includes a hash table of the de-duplication chunks and a storage volume where the de-duplication chunks will be stored. Each de-duplication scope is assigned to a respective backup source data, such as email server data, file server data, or so forth. When the time comes to begin a backup task for a particular type of data, for instance data of an email server, the backup management module sets a corresponding de-duplication scope in the storage system. The storage system turns on only the disk drives related to the specified de-duplication scope and keeps the rest of the disk drives powered off. The backup management module writes a backup data stream to the storage system, and the de-duplication module on the storage system performs the de-duplication process by utilizing a hash table and chunk volume that were previously set for the de-duplication scope applicable for the particular data type. Thus, the source data is backed up to the storage system using de-duplication by consolidating the redundant data portions while other disks used for backing up data of a different scope remain powered off.

By partitioning a comparison target area according to the de-duplication scope, the process will lose only a little of the effectiveness of de-duplication. For example, the reason why data de-duplication works well for data backup operations is because a specific source data is backed up repeatedly. On the other hand, performing data de-duplication between different sources of data has a much smaller expectation of efficiency for reducing the size of the data being stored. Therefore, reducing power consumption by a large amount is more effective in this situation than attempting to de-duplicate large amounts of data with little data actually being de-duplicated. Thus, the method set forth by the invention is more valuable from both a total cost of ownership perspective and an environmental perspective. Having multiple such de-duplication scopes within a single storage system, such as a VTL storage system, and integrating power supply control allows a large percentage of the disk drives to be powered off during the numerous long backup windows common in data storage facilities, and turning on entire sections of a storage system can be avoided. Further, while embodiments of the invention are described in the context of an example of a VTL system, it will be apparent to those of skill in the art that the invention can be applied to other data backup storage systems, archive storage systems and the like.

First Embodiment

Hardware Architecture

FIG. 1 illustrates an example of a physical hardware architecture of an information system of the first embodiments. The information system of these embodiments consists of a storage system 100, one or more application computers 110 and a management computer 120. Application computer 110, management computer 120 and storage system 100 are connected for communication through a network 130, which may be a SAN (Storage Area Network), a LAN (Local Area Network), a WAN (Wide Area Network), or other type of network. Further, for example, if a SAN is used as network 130, a LAN (not shown) may also be included for additional communication between management computer 120 and storage system 100 as a management-dedicated network.

Storage system 100 includes a controller 101 for controlling access to a plurality of storage devices, such as storage mediums 106. Controller 101 includes a CPU 102, a memory 103, and one or more ports 104 for connecting with network 130. Storage mediums 106 are connected for communication with controller 101, and may be hard disk drives in the preferred embodiment, but in other embodiments could be any of a variety of other types of storage devices, such as solid state memory, optical disks, tape drives, and the like. VTL or other backup functionality can be integrated into storage system 100 as described in this example, but in other embodiments, this functionality may be provided separately from a general storage system as an independent appliance.

Application computer 110 may be a computer that comprises a CPU 111, a memory 112, a port 113, and a storage medium 114. Application computer 110 may be a server on which an application is executed, and which maintains data related to the application. In the example illustrated, the application data may be assumed to be stored in the internal storage medium 114, but it could also be stored to an external storage system connected to the application computer, such as through network 130.

Management computer 120 may be a computer server that includes a CPU 121, a memory 122, and a port 123. Management computer 120 is a terminal computer that can be used by a backup administrator to manage the backup tasks on storage system 100, and backing up data from application computers 110 to storage system 100.

Logical Element Structure

FIGS. 2 and 3 illustrate an exemplary software and logical element structure of this embodiment. As illustrated in FIG. 2, elements on the application computer 110 include an application 280 which is a module on application computer 110 that creates enterprise data of a particular type, such as e-mail, for instance. Data that is created by the application 280 is stored in a source volume 270, such as on storage medium 114 on the application computer 110.

Management computer 120 includes a backup management module 290 that controls the entire backup process. Management computer 120 first specifies which application data (e.g., source volume 270) is to be backed up to the storage system 100. After the storage system 100 is ready, controller 101 receives backup source data from application computer 110. Backup schedule table 500 maintains information regarding the time when each data source is to be backed up, and also identification (i.e., "de-duplication scope" described further below) of each backup data which is specified to the storage system before starting the data transfer.

Storage Volume Composition

Each array group 210 is a logical storage capacity that is composed of physical capacity from plural storage mediums 106, and may be configured in a RAID (Redundant Array of Independent Disks) configuration. For example, an array group can be composed as a RAID 5 configuration, such as having three disks that store data and another disk that stores parity data for each data stripe. Target volumes 220 are logical storage extents (i.e., logical volumes) which are created as available storage capacity by carving out available storage space from one of array groups 210. In FIG. 2, a target volume 220-1 is generated from array group 210-1, a target volume 220-2 is generated from array group 210-2, and a target volume 220-3 is generated from array group 210-3. Each target volume 220 is a logical volume that holds backup data for a specific source volume 270 of one of application computers 110 (typically in a one-to-one relation). Each target volume 220 holds a plurality of data chunks 230. A chunk 230 is a portion of backed up data that has been stored in the volume 220. However, because the de-duplication process consolidates chunks that have same pattern of bytes during the backup process, each chunk 230 contained in a volume 220 has a unique content in comparison with the other chunks 230 within that respective target volume 220. A chunk 230 is composed of plural blocks 240. The maximum number of blocks within a chunk 230 is limited to a specified amount, but not all of these blocks need to be filled in any particular chunk. During a backup process for a particular source volume 270 only the corresponding target volume 220 will be powered on, which means only the storage mediums 106 making up the particular array group 210 from which the target volume 220 is allocated need to be turned on, and the rest of storage mediums 106 and their corresponding target volumes 220 can remain in the powered-off condition. Thus according to the illustrated embodiment, every target volume 220 is preferably allocated from a different array group. Or, in other words, allocating target volumes across multiple array groups is avoided.

Software On the Controller

As illustrated in FIG. 2, de-duplication module 200 is a program for providing the de-duplication service to the storage system 100 in response to direction from backup management module 290. De-duplication module 200 is configured to also control the power supply for turning on and off target volumes 220 by controlling the power supply to the storage mediums 106 making up the corresponding array groups 210. When any specific de-duplication scope is specified from backup management module 290, de-duplication module 200 turns on the related target volume by turning on the power supply to the storage mediums in the corresponding array group. De-duplication module 200 then accepts write requests for writing the data stream of the backup data to the target volume 220 corresponding to the de-duplication scope specified by the backup management module 290. During the writing of the data to the target volume, de-duplication module 200 breaks the data stream down to the size of chunks, and compares the new data with chunks already stored on the target volume. When a new data pattern is identified, de-duplication module 200 creates a new chunk with that portion of the backup data stream, and stores the new chunk in the target volume. On the other hand, when a portion of the backup data stream is identical to an existing chunk, de-duplication module 200 only creates an additional link to the existing chunk. After completion of processing of the entire quantity of backup data, the target volume may be turned off again by de-duplication module 200, which may be triggered by an instruction from backup management module 290.

Controller 101 also includes data structures used by de-duplication module 200. A scope table 600 holds records of de-duplication scope information to find a set of a hash table 800, a chunk table 900, a backup image catalog table 1000 and a target volume 220 for a specific scope. An array group table 700 holds records of array group information for enabling de-duplication module 200 to determine which set of storage mediums make up a particular array group. Each hash table 800 holds hash values generated for each chunk in a corresponding target storage volume 220. The hash values are used for carrying out an initial comparison of incoming new data with existing chunks in the volume. Chunk table 900 holds the information of locations (logical block address—LBA) where each chunk is actually stored within a respective target volume 220. Backup image catalog table 1000 holds the information of backed up images for a particular target volume 220, and has mapping information of each image to chunks stored in the particular target volume. Hash table 800, chunk table 900 and backup image catalog table 1000 will be generated so that there is one for each target volume or corresponding scope.

Components of De-duplication Scope

As illustrated in FIG. 3, de-duplication scope 300 is the logical group which holds a set of elements needed to perform data backup while utilizing the de-duplication function for the specific source volume 270. Thus, a de-duplication scope 300 consists of a target volume 220, a hash table 800, a chunk table 900, and a backup image catalog table 1000. The storage system of the invention has multiple sets of such scopes, and is able to switch from one scope to the next based on commands received from backup management module 290 (i.e., only one scope set is used during a specific backup process for a specific source volume).

Backup Schedule Table

FIG. 4 illustrates an example of a data structure of backup schedule table 500, which includes a backup source name 510 that identifies the name for the backup source data. A trigger timing 520 indicates the time to start the backup process for the data from the particular backup source. A scope ID 530 identifies the de-duplication scope to be used for the backup source. For example, line 591 indicates a record for the backup source data "Email" that is scheduled to be backed up from every "2:00 am on Wednesday" and that has a de-duplication scope at storage system with a scope ID of "S1". Back up schedule table 500 is maintained in management computer 120, and is referred to by backup management module 290 to determine when to start each backup process and which scope storage system 100 should use.

Scope Table

FIG. 5 illustrates an example of a data structure of scope table 600, which includes a scope ID 610 that identifies the de-duplication scope. A hash ID 620 identifies the hash table 800 which belongs to the particular scope. A chunk table ID 630 identifies the chunk table 900 that belongs to the particular scope. A catalog ID 640 identifies the backup image catalog table 1000 that belongs to the particular scope. A target volume ID 650 identifies the target volume 220 that belongs to the particular scope. An array group ID 660 identifies the array group which the target volume was originally carved from. For instance, line 691 illustrates a record in which the de-duplication scope "S1" consist of a hash table "H1", a chunk table "CT1", a backup image catalog table "CLG1", and the backup data will be stored on a target volume "V1" which was carved from array group "A1". Components of each scope are generated one by one for their respective scopes, and thus the storage system will have multiple sets of these components, i.e., one set for each scope. Scope table 600 is referred to by de-duplication module 200 to locate the set of tables 800, 900, 1000 and target volume 220 corresponding to the specified de-duplication scope 300 that is used for backing up the data specified by backup management module 290.

Array Group Table

FIG. 6 illustrates an example of a data structure of array group table 700, which includes an array group ID 710 that identifies the array group for each entry. A medium ID 720 identifies the storage medium corresponding to an array group. For instance, entries 791, 792 and 793 represents records of an array group "A1" that includes storage mediums "M1", "M2" and "M3" therein. Array group table 700 is referred to by de-duplication module 200 to determine which set of storage mediums 106 make up a certain array group 210 so that the power for particular storage mediums can be turned off and on.

Hash Table

FIG. 7 illustrates an example of a data structure of hash table 800. A hash value entry 810 contains a hash value generated from a respective chunk by de-duplication module 200 during the backup process. A chunk ID 820 identifies the chunk within the specific target volume for which the hash table has been generated. For instance, line 891 represents a record of a chunk which has "S1HV1" as the Hash Value and that has a chunk ID is "S1Ch1". It should be noted that the same hash value can sometimes be generated for chunks that actually have different data content, such as is illustrated at line 892 for chunk ID "S1Ch2" and line 893 for chunk ID "S1Ch3", which both have the same hash value "S1HV2". Thus, hash table 800 is used by de-duplication module 200 for making an initial comparison between newly divided source backup data and existing chunks on the target volume. Then, if a matching hash value is identified, a direct bit-to-bit or byte-to-byte comparison is carried out to determine if the data is truly identical to the existing chunk. One hash table 800 is generated for each de-duplication scope 300.

Chunk Table

FIG. 8 illustrates an example of a data structure of chunk table 900, that includes a chunk ID 910 which identifies particular chunks. A start LBA 920 indicates the LBA on the target volume that is the starting address of the respective chunk. A number of blocks 930 indicates a number of valid blocks within the respective chunk. For instance, line 991 represents a record of a chunk that has "S1Ch1" as the chunk ID, the chunk is stored starting at LBA "0" on the volume, and then number of valid blocks is "32" blocks from the starting LBA. During the de-duplication process a backup source data byte stream is divided into portions that are of a size equal to the maximum number of blocks of a chunk (e.g., 32 blocks in this example). However, it may happen that the end portion of the data might not exactly divide into this boundary, and thus some chunks will often be smaller in length than the maximum number of blocks allowed in a chunk. When this happens, the number of blocks 930 in chunk table 900 indicates the end point of valid data when a comparison is being carried out. For example, line 992 shows a chunk ID "S1Ch2" starts at LBA 32, and contains 25 blocks of valid data. The remainder of this chunk may be filled with null data that is ignored by de-duplication module 200 for data comparison purposes. Chunk table 900 is updated and referred to by de-duplication module 200 to use for accessing the content of each chunk during the comparison between newly divided source backup data and existing chunks on the target volume. One chunk table 900 is created and maintained for each de-duplication scope 300.

Backup Image Catalog Table

FIG. 9 illustrates an example data structure of backup image catalog table 1000, that include a backup image ID 1010 which identifies the backup image. A timestamp 1020 indicates the timestamp for the start time of the backup process for the particular backup image. A sequential number 1030 indicates a sequential number for each divided portion of the backup data stream. A chunk ID 1040 indicates the chunk that corresponds to that divided portion of the data. For instance, line 1091 represents a record of a chunk "S1Ch1" which belongs to backup image "S1BU0000" that was backed up at "T1" (some time value) and that was the first divided portion (sequential number "0") of the backup data stream. Backup image catalog table is updated and referred to by de-duplication module 200 when backup is performed utilizing the de-duplication function.

Process of Data Backup

FIG. 10 illustrates an example of a process for data backup of application data executed by backup management module 290 and de-duplication module 200. The process typically begins when the time to backup the application has arrived, as indicated by backup schedule table 500. Alternatively, the process may be triggered manually by an administrator. Backup management module 290 will determine the scope that corresponds to the particular application and make storage system 100 ready to carry out the backup by instructing setting of the scope. Storage system 100 identifies the corresponding tables for the specified scope and powers on the target volume that belongs to the scope. The application data is backed up to the target volume while the de-duplication function is also performed. The target volume may be powered off following the completion of the backup process. In this example, an "Email" application will be backed up.

Step 1500: Backup management module 290 selects a scope ID 530 from backup schedule table 500 in which the record has the backup source name 510 set as "Email", whose trigger timing has come due.

Step 1510: Backup management module 290 sends a command to the storage system 100 to set the scope ID for the selected scope.

Step 1520: De-duplication module 200 performs a "Scope Setting Process", as set forth in FIG. 11, to identify and select the tables 800, 900, 1000 for the specified scope and to power on the corresponding target volume 220.

Step 1530: Backup management module 290 receives backup source data from the respective application computer 110 and transfers that data stream to the storage system 100.

Step 1540: De-duplication module 200 performs a "Data Write Process", as set forth in FIGS. 12A-12B, that writes the received data to the target volume 220 while utilizing the de-duplication function.

Step 1550: When the transfer of the backup data to the storage system has been completed, backup management module 290 sends a notice to the storage system 100 that the backup process is completed.

Step 1560: De-duplication module turns off the power to all storage mediums 106 that were powered on in step 1520.

Scope Setting Process

FIG. 11 illustrates an example of a process for setting the scope on the storage system before the actual data backup (i.e., writing of data to the target volume) starts to be executed by de-duplication module 200. The scope setting process selects tables for the specified scope and powers-on the storage mediums for the target volume belonging to the scope.

Step 1600: De-duplication module 200 selects IDs of the scope elements for the specified de-duplication scope 300 from scope table 600, such as hash table ID, chunk table ID, backup image catalog table ID, target volume ID and array group ID corresponding to the identified scope ID.

Step 1610: De-duplication module 200 identifies all medium IDs 720 from array group table 700 of the storage mediums 106 that correspond to the array group ID obtained in step 1600.

Step 1620: De-duplication module 200 powers on the storage mediums 106 that were identified in step 1610.

Data Write Process

FIGS. 12A-12B illustrate an example of a process to write backup source data to one of target volumes 220 that is executed by de-duplication module 200. The process (a) divides the backup data into chunk-sized pieces, (b) compares hash values calculated for the divided portions with the existing hash values for existing data already stored in the storage system, c) compares the divided portion with actual chunk content if the hash values match, and d) stores a new chunk to the storage system when the divided portion does not match any of the data already stored, and e) updates the related tables 800, 900, 1000 of the scope.

Step 1700: De-duplication module 200 initializes the variable "v_SequentialNumber" to 0 (zero) to keep track of sequence numbers for the particular backup image.

Step 1710: De-duplication module 200 breaks down the data stream into the size of a chunk by dividing the backup data as it is received into portions having a number of blocks that is the same as the maximum designated number of blocks of a chunk. In the example give above with reference to FIG. 8, the maximum number of blocks for a chunk is 32 blocks, but any other practical number of blocks may be used.

Step 1720: De-duplication module 200 selects one of the divided data portions created in step 1710 for processing. If every piece of the divided data portions of the backup data has already been processed then the process ends; otherwise the process goes to Step 1730.

Step 1730: De-duplication module 200 generates a new hash value for the divided backup data portion selected in Step 1720. The particular hash function used is not essential to the invention. For example, MD5, SHA1, SHA256, or the like, can be used.

Step 1740: De-duplication module 200 identifies any records in the hash table 800 that have an existing hash value that matches the newly-generated hash value calculated in Step 1730. If there are no records having a hash value that match or every record having a matching hash value has already been processed, then the process goes to Step 1800 in FIG. 12B (i.e., the data content of the particular divided data portion being examined is unique, and it will be necessary to create new chunk on the target volume 220 to store the divided data portion). Otherwise, if one or more matching hash values are located in Step 1740, the process goes to Step 1750 for direct data comparison. As discussed above, the hash table 800 used here for the comparison is selected by the hash table ID obtained in step 1600 of the Scope Setting Process described above with reference to FIG. 11.

Step 1750: De-duplication module 200 identifies from hash table 800 the chunk ID of the chunk that has the matching hash value, and then uses this chunk ID to obtain the start LBA 920 and number of blocks 930 of the identified chunk from chunk table 900. This information shows the storage location and length of the actual chunk content that has the same hash value as the divided backup data portion being examined. The chunk table used here for the comparison is selected by its ID obtained in step 1600 of the Scope Setting Process described above with reference to FIG. 11.

Step 1760: De-duplication module 200 directly compares the byte stream of the divided backup data portion with the content of the existing chunk obtained in step 1750. If the byte pattern matches, then the data has content that is identical to content already stored in the storage system, and it is not necessary to store the data again because the chunk previously stored on the target volume can be shared and a new chunk does not have to be created, so the process goes to Step 1770. Otherwise, if the byte patterns do not match each other, the process goes back to Step 1740 to process any other matching hash values.

Step 1770: Since the identical data content is already stored on the target volume, it is not necessary to create and store a new chunk, so de-duplication module 200 sets a variable "v_chunkID" as the chunk ID of the existing chunk that was selected in step 1740, and then proceeds to Step 1850 in FIG. 12B.

Step 1800: Referring to FIG. 12B, following Step 1740, when no matching hash value or identical content were found for the divided data portion being examined, a new chunk needs to be stored for the particular divided data portion. De-duplication module 200 obtains an ID of an empty chunk for target volume 220 (or de-duplication module could create any unique chunk ID for a portion of volume) and also obtains a start LBA of target volume 220 for storing the backup data portion as the new chunk. Allocating the volume capacity for the new chunk may be carried out by various methods. For example, the entire capacity of the target volume 220 can be partitioned into chunks having the maximum number of blocks for a chunk when the volume 220 is initially allocated. This can create an available pool of equal-sized storage areas, and the boundary block address of each of these partitioned areas can then be provided as the start LBA for storing a new chunk, one by one, as a new empty chunk is requested.

Step 1810: De-duplication module 200 stores the backup data portion content as the new chunk into the target volume 220 at the LBA specified by the start LBA obtained in Step 1800.

Step 1820: De-duplication module 200 creates a new record in hash table 800 using the hash value generated in Step 1730 and the chunk ID obtained in Step 1800.

Step 1830: De-duplication module 200 creates a new record in chunk table 900 using the chunk ID and start LBA obtained in Step 1800 and the length in number of blocks of the newly-stored backup data content.

Step 1840: De-duplication module 200 sets the variable "v_ChunkID" to be the chunk ID obtained in Step 1800 (i.e., the ID of the new chunk).

Step 1850: De-duplication module 200 inserts new record to backup image catalog table 1000 and fills in the values below. The backup image ID 1010 is a unique ID for the backup image being processed that is allocated either by de-duplication module 200 or backup management module 290. The timestamp 1020 indicates the beginning time of the current backup process. The sequential number 1030 is the value of the variable v_SequentialNumber, which is the sequence number of the divided data portion that was processed. The chunk ID is the value of the variable v_ChunkID, which value depends on whether a new chuck was created (Steps 1800-1840) or whether an existing chunk was found that had identical content (Step 1770).

Step 1860: De-duplication module 200 increments the value of the variable v_SequentialNumber and proceeds back to Step 1720 to repeat the process for the next divided data portion of the backup data. When all portions of the backup data have been examined and an entry stored in backup image catalog table 1000, the process ends.

Thus, the de-duplication solution of the invention provides a means for reducing the amount of data that needs to be stored while the disk power control technology reduces the overall power consumption of the storage system. Under the data backup arrangement of the invention, only a portion of the storage mediums need to be turned on and the rest of the storage mediums can remain turned off. The storage system holds a plurality of de-duplication scopes internally in the system, and each de-duplication scope is assigned to a respective backup source data such as email server data, file server data, and so on. When the time comes to begin a backup task for a particular data source, the backup management module sets the corresponding de-duplication scope, and then turns the power to only the storage mediums related to the specified de-duplication scope, and keeps the remainder of the storage mediums in the powered-off condition. The de-duplication process is carried out for the particular volume included in the set de-duplication scope, thereby eliminating redundant data portions while other backup target volumes are kept turned off. Additionally, when backup data needs to be retrieved, only the storage mediums corresponding to the particular volume containing the data need to be turned on, and the desired backup image can be read out using the corresponding backup image catalog table and chunk table. Further, while the invention has been described in the environment of a VTL backup storage system, the invention is also applicable to other types of backup storage systems, archive storage systems and other types of storage systems in which the de-duplication scopes of the invention may be applied.

From the foregoing, it will be apparent that the invention provides methods and apparatuses for reducing power consumption for a storage system by controlling the storage device power supply while at the same time utilizing a de-duplication function on the storage system to reduce the amount of storage capacity used. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of operating a storage system having a controller in communication with one or more storage mediums, the method comprising the steps of:
  acquiring one or more disc array group IDs to which a data is allocated;
  acquiring one or more medium IDs corresponding to the acquired one or more disc array group IDs;
  powering on one or more storage mediums corresponding to the acquired one or more medium IDs;
  transferring the data to the one or more storage mediums which were powered on;
  comparing content of the data with content of any existing data stored in the one or more storage mediums which were powered on; and
  keeping the content of the data in the one or more storage mediums which were powered on when the content of the data does not correspond to the existing data stored in the one or more storage mediums.

2. The method according to the claim 1, further including:
  storing an information linking an identifier of the data with an identifier of the existing data stored in the one or more storage mediums that were powered on when the content of the data corresponds to the existing data stored in the one or more storage mediums.

3. The method according to the claim 2, further including:
  powering off the one or more storage mediums which were powered on following completion of the storing the information linking an identifier of the data with an identifier of the existing data stored in the one or more storage mediums.

4. The method according to the claim 1,
  wherein storage mediums other than the storage mediums which were powered on are in power off status.

5. The method according to the claim 1, further including:
  powering off the one or more storage mediums which were powered on following completion of the storing the content of the data.

6. The method according to the claim 1,
  wherein hash values of the existing data stored in the one or more storage mediums are managed in the storage system, the method further including:
  calculating a hash value for the content of the data in order to compare the content of the data with the content of any existing data stored in the one or more storage mediums.

7. A storage system having a controller in communication with one or more storage mediums, the storage system comprising:
  an acquiring module to acquire one or more disc array group IDs to which a data is allocated, wherein the acquiring module acquires one or more medium IDs corresponding to the acquired one or more disc array group IDs;
  a power control module to power on one or more storage mediums corresponding to the acquired one or more medium IDs;
  a data transfer module to transfer the data to the one or more storage mediums which were powered on; and
  a comparison module to compare content of the data with content of any existing data stored in the one or more storage mediums;
  wherein the controller keeps the content of the data in the one or more storage mediums which were powered on when the content of the data does not correspond to the existing data stored in the one or more storage mediums.

8. The storage system according to the claim 7,
wherein the controller stores an information linking an identifier of the data with an identifier of the existing data stored in the one or more storage mediums that were powered on when the content of the data corresponds to the existing data stored in the one or more storage mediums.

9. The storage system according to the claim 8,
wherein the power control module powers off the one or more storage mediums which were powered on following completion of the storing the information linking an identifier of the data with an identifier of the existing data stored in the one or more storage mediums.

10. The storage system according to the claim 7,
wherein storage mediums other than the storage mediums which were powered on are in power off status.

11. The storage system according to the claim 7,
wherein the power control module powers off the one or more storage mediums which were powered on following completion of the storing the content of the data.

12. The storage system according to the claim 7,
wherein hash values of the existing data stored in the one or more storage mediums are managed in the storage system, the storage system further including:
a calculator module to calculate a hash value for the content of the data in order to compare the content of the data with the content of any existing data stored in the one or more storage mediums.

13. A storage system having a controller in communication with one or more storage mediums, the storage system comprising:
an acquiring module to acquire one or more disc array group IDs to which a data is allocated, wherein the acquiring module acquires one or more medium IDs corresponding to the acquired one or more disc array group IDs;
a power control module to power on one or more storage mediums corresponding to the acquired one or more medium IDs;
a data transfer module to transfer the data to the one or more storage mediums which were powered on; and
a comparison module to compare content of the data with content of any existing data stored in the one or more storage mediums;
wherein the controller stores the content of the data to the one or more storage mediums which were powered on when the content of the data does not correspond to the existing data stored in the one or more storage mediums; and
wherein the controller stores an information linking an identifier of the data with an identifier of the existing data stored in the one or more storage mediums that were powered on when the content of the data corresponds to the existing data stored in the one or more storage mediums.

14. The storage system according to the claim 13,
wherein the power control module powers off the one or more storage mediums which were powered on following completion of the storing the information linking an identifier of the data with an identifier of the existing data stored in the one or more storage mediums.

15. The storage system according to the claim 13,
wherein storage mediums other than the storage mediums which were powered on are in power off status.

16. The storage system according to the claim 13,
wherein the power control module powers off the one or more storage mediums which were powered on following completion of the storing the content of the data.

17. The storage system according to the claim 13,
wherein hash values of the existing data stored in the one or more storage mediums are managed in the storage system, the storage system further including:
a calculator module to calculate a hash value for the content of the data in order to compare the content of the data with the content of any existing data stored in the one or more storage mediums.

* * * * *